(12) United States Patent
Zolfaghari

(10) Patent No.: US 6,674,757 B1
(45) Date of Patent: Jan. 6, 2004

(54) COMMUNICATIONS NETWORK AND METHOD OF ROUTING MESSAGES WITHIN THE NETWORK

(75) Inventor: Majid Zolfaghari, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/439,160

(22) Filed: Nov. 12, 1999

(30) Foreign Application Priority Data

Nov. 12, 1998 (SE) .............................................. 9803869

(51) Int. Cl.⁷ .............................................. H04L 12/56
(52) U.S. Cl. ............................ 370/395.31; 370/395.54
(58) Field of Search ................................ 370/235, 238, 370/238.1, 256, 254, 351, 379, 382, 395.3, 395.31

(56) References Cited

U.S. PATENT DOCUMENTS

| 4,466,060 A | * | 8/1984 | Riddle ........................ 364/200 |
| 5,295,154 A | | 3/1994 | Meier et al. |
| 6,041,049 A | * | 3/2000 | Brady ......................... 370/351 |
| 6,369,819 B1 | * | 4/2002 | Pitkow et al. .............. 345/440 |

FOREIGN PATENT DOCUMENTS

| EP | 0568477 | 11/1993 |
| WO | 92/05648 | 4/1992 |
| WO | 97/02680 | 1/1997 |

* cited by examiner

*Primary Examiner*—Wellington Chin
*Assistant Examiner*—Brenda Pham

(57) ABSTRACT

A communications network includes a plurality of nodes with unique identities and a server unit. Each node is provided with a first storing device for storing a list of all nodes neighboring the node which are directed to it and a second storing device containing a data field which forms an array of cells indexed for all nodes in the network. A third storing device is provided in the server unit for forming a temporary queue. Messages are routed within the network by transforming a graph-representation of the network into a tree model with the destination node as root. This tree is the shortest which the graph can be transformed into.

8 Claims, 3 Drawing Sheets

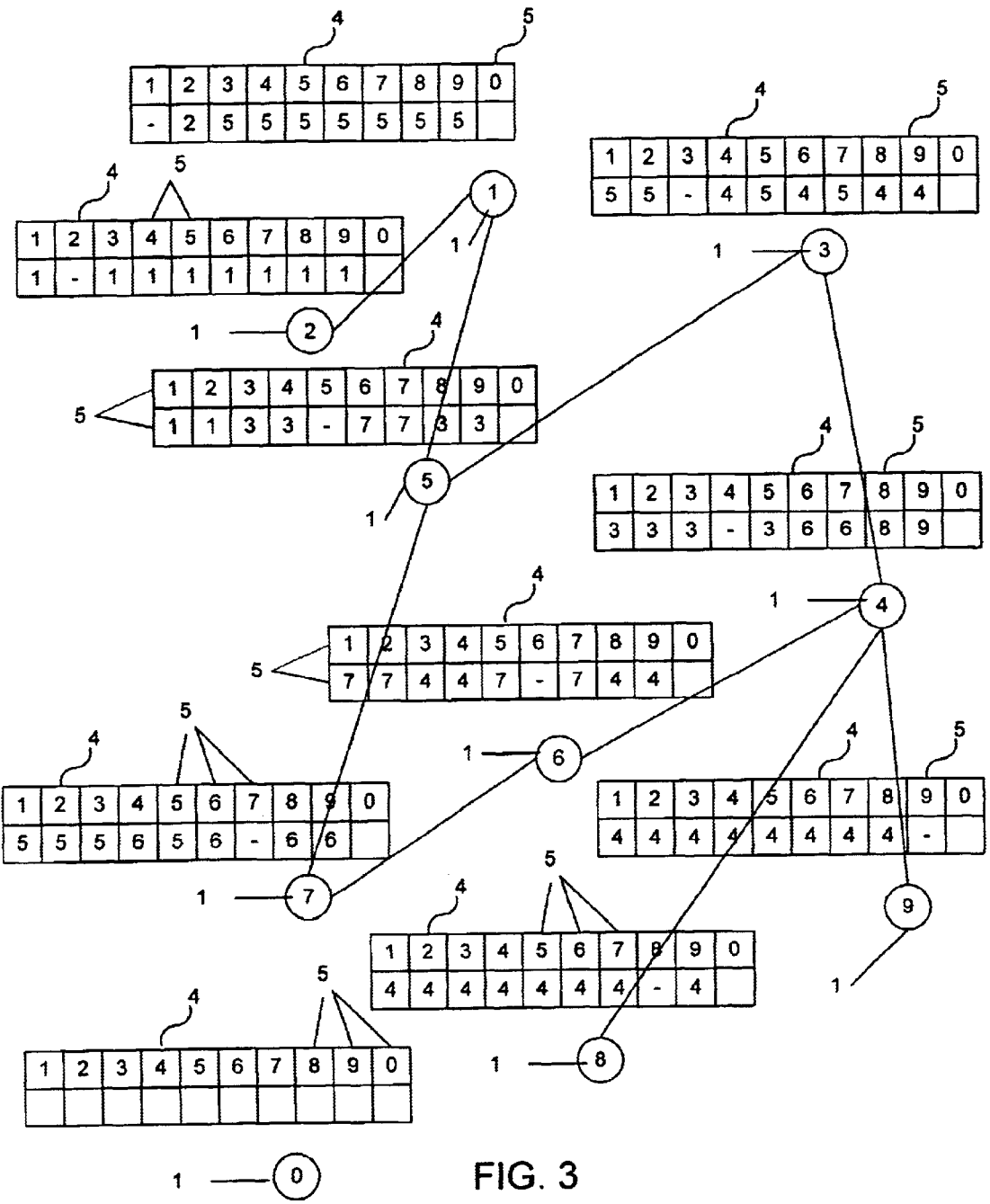

COMMUNICATIONS NETWORK AND METHOD OF ROUTING MESSAGES WITHIN THE NETWORK

TECHNICAL FIELD

The present invention relates to a communications network for sending messages between a plurality of nodes having unique identities, said network comprising a server unit. The invention also relates to methods of routing messages within a communications network.

BACKGROUND

For example in the field of packet switched networks, information packets are routed from a sending node via a number of intermediate nodes to a receiving node. The basic problem for this operation, is that of minimising the length of the path between the sending and receiving nodes, i.e. the shortest path problem. The theoretically optimal solution to the problem is known as Djikstra's algorithm. However, this is an ideal mathematical solution that cannot be implemented in its theoretical form.

Prior art solutions may involve the use of distributed routing tree information, where each node is provided with a routing tree that represents the shortest path to all connected nodes, see U.S. Pat. No. 4,987,536. Other solutions may include a central route determining node, see U.S. Pat. No. 5,608,721. The prior art solutions are not very cost-efficient,

SUMMARY

One object of the invention is to find the shortest path from an arbitrary node to another arbitrary node in a uni- or bi-directional network with a minimum of stored information in each node.

For this object, the communications network according to the invention is characterized in that each node is provided with; first storing means for storing a list of all nodes neighbouring said node, which are directed to it, second storing means containing a data field for registration of identity of one node, and that a third storing means is provided in the central unit for forming a temporary queue.

In a particular embodiment of the communications network, the data field of the second storing means forms an array of cells which is indexed for all nodes in the network, said array being sized in proportion to the number of nodes in the network and wherein each cell is arranged to contain the identity of one node.

An advantageous embodiment of the invention, the distance between each pair of nodes is represented by a number of assumed virtual nodes, wherein said number is proportional to said distance.

Alternatively, the traffic load between two nodes is represented by a number of assumed virtual nodes, wherein said number is proportional to said traffic load.

A method of routing messages within a communications network for sending messages between a plurality of nodes having unique identities, for calculation of the shortest path between a first node and a second node is characterized in the steps of forming a list of the identities of all nodes neighbouring said first node and to which it is directed, putting the identity of the second node in a queue, writing a stop command in a data field for registration of identity of the second node, taking the identity of the node in front of the queue and writing its identity in the data field of all its neighbours, unless there already is an entry in this data field, putting the identity of a node in the queue each time an entry is written into the data field of this node, removing from the queue the identity of the node in front of the queue, after visiting all nodes in the list of all neighbouring nodes of said node, and repeating the step of taking the identity of the node in front of the queue and writing its identity in the data field of all its neighbours, until the visited node is the first node.

Advantageously, the network is checked for nodes which have been disconnected from a certain node.

Preferably, said checking comprises the steps of putting the identity of said node (n) in the queue and marking said node, taking the node in front of the queue and marking its unmarked neighbours, each time the identity of a new node is marked, it is placed in the queue, after visiting all nodes in the list of the identities of all nodes neighbouring said node in front of the queue, said node is removed from the queue and put in a set, repeating the step of taking the node in front of the queue and marking its unmarked neighbours until the queue is empty, and subtracting the resulting set from the set of all nodes which said node is aware of, wherein the result is the set of nodes which are disconnected from the aforementioned node.

A method of routing messages within a communications network for sending messages between a plurality of nodes having unique identities, for calculation of the shortest path between all pairs of nodes in the network is characterized in the steps of; forming a list of the identities of all nodes neighbouring a node and to which it is directed, putting the identity of the node in a queue, writing a stop command for this node in an array data field indexed for registration of identity of all nodes in the network, taking the identity of the node in front of the queue and writing its identity in the data field of all its neighbours, unless there already is an entry in this data field, putting the identity of the visited node in the queue each time an entry is written into the date field of a node, removing from the queue the identity of the nods in front of the queue, after visiting all nodes in the list of all neighbouring nodes of said node, repeating the step of taking the identity of the node in front of the queue and writing its identity in the data field of all its neighbours, until the queue is empty, and repeating the above step for all nodes in the network.

Advantageously, the network is checked if a node has connection to all other nodes.

Preferably, said checking comprises the steps of putting the identity of said node in the queue and marking said node, taking the node in front of the queue and marking its unmarked neighbours, each time the identity of a new node is marked, it is placed in the queue, after visiting all nodes in the list of the identities of all nodes neighbouring said node in front of the queue, said node is removed from the queue and put in a set, repeating the step of taking the node in front of the queue and marking its unmarked neighbours until the queue is empty, and subtracting the resulting set from the set of all nodes which said node is aware of, wherein the result is the set of nodes which are disconnected nodes.

BRIEF DESCRIPTION OF THE DRAWINGS

The invention will in the following be further described in a non-limiting way under reference to the accompanying drawings in which:

FIG. 2 shows a queue used during the calculation of the path in accordance with FIG. 1, FIG. 3 schematically illustrates the calculated shortest path between all pairs of nodes.

DETAILED DESCRIPTION

The purpose is to find the shortest path from an arbitrary node n1 to another arbitrary node n2 in a bi-directional network.

Each node should keep the following information:

A "Neighbour List" of all neighbours of a node 1. This list is input to the algorithm. One instance is required for each node.

A "Next To Goal" data field 2 for registration of identity of one node. This field will be filled by the algorithm and will contain the information needed for routing. One instance of this field is required for each node.

A server unit maintains a "Queue" 3 which is a temporary queue that will be deleted when the algorithm has been completed. The algorithm for calculating the shortest path from node n1 to node n2 includes the following steps;

Step 1: Put n2 (not n1) in the queue 3. Write a stop command, i.e. "-" in "Next To Goal" of node n2.

Step 2: Take the node in front of the queue and write its identity in the "Next To Goal" list of all its neighbours (nodes in its Neighbour List) if the cell is not already written. If the cell is already written, do not write over it. If the visited node is node n1, the algorithm is done. If the queue is empty but node n1 is not visited, it means that node n1 is not connected to node n2.

Step 3: Each time you write (only if you write) in "Next To Goal" of a node, put the node in the queue 3.

Step 4: After visiting all nodes in the "Neighbour List" of the node (in front of the queue), remove it from the queue.

Step 5: Go to step 2.

END

After the algorithm has been completed, for traversing the shortest path from node n1 to node n2:

Go to the node 1 which is pointed by the "Next To Goal" 2 of node n1.

Continue in the same manner until you reach node n2.

Figure 1:
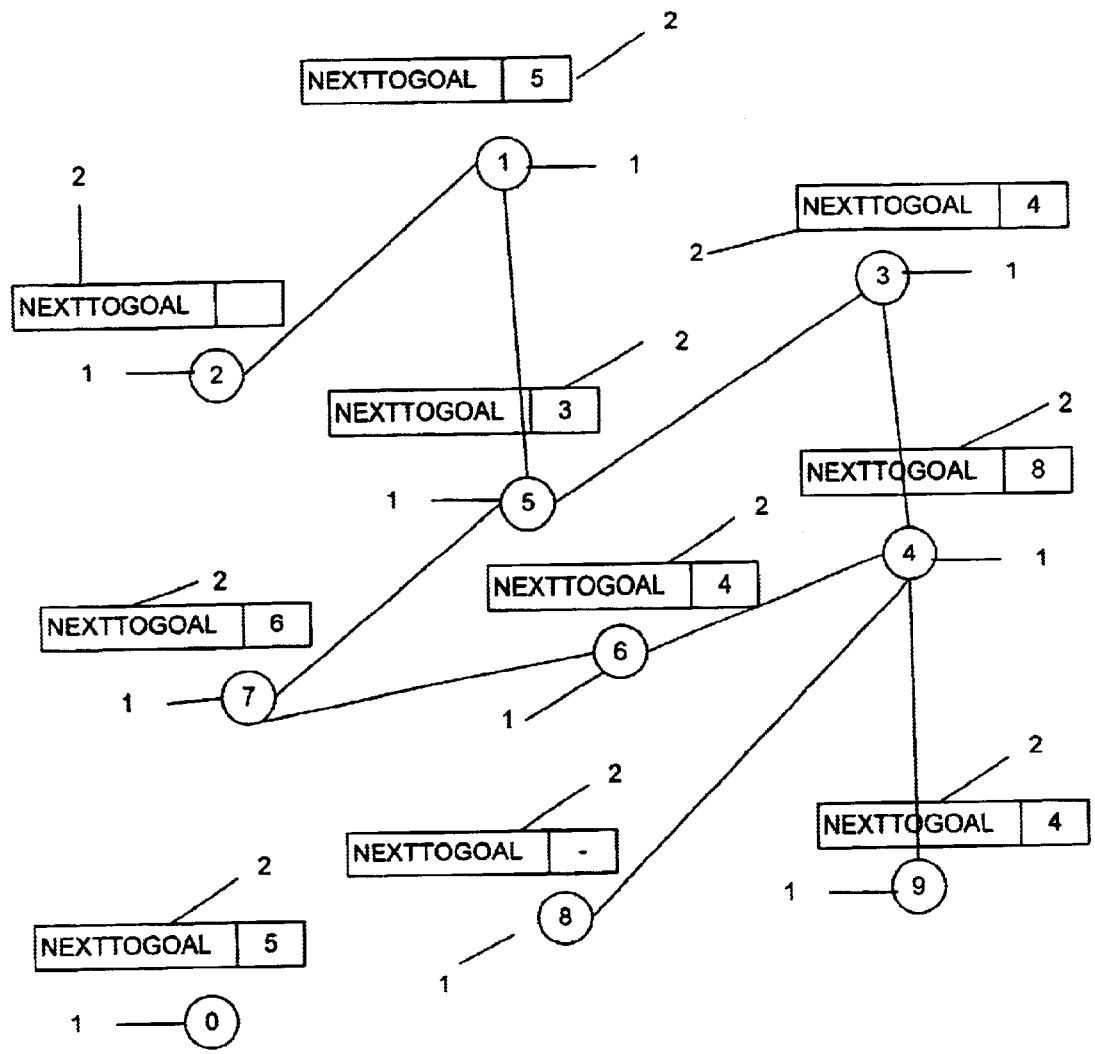
FIG. 1 schematically illustrates the calculated shortest path from one node to another node, in accordance with the invention.

The above described algorithm actually transforms the graph-representation of the network to a tree model with the destination node as root, wherein the tree is the most shallow (shortest) tree which the graph may be transformed into. FIG. 1 shows the result of the algorithm after calculating the shortest path from node 1 to node 8. FIG. 2 shows the queue used in the process of obtaining said shortest path.

It is possible to check for nodes which have been disconnected from a node n. Every time a node is removed from the queue, it should be entered into a "Visited Nodes" set:

Step 1: Put n in the queue 3 and mark the node,

Step 2: Take the node in front of the queue and mark its unmarked neighbours.

Step 3: Each time you mark a new node, put it in the queue.

Step 4: After visiting all nodes in "Neighbour List" of the node (in front of the queue) moire it from the queue to "Visited Nodes Set".

Step 5: Go to Step 2 until the queue 3 is empty.

END

When the algorithm is completed, subtract the "Visited Set" from the set of all nodes which node n knows about. The result is the set of disconnected nodes.

When a node wants to send a message to the destination node (node 8 in FIG. 1) it has only one way up the root and this way is the shortest. According to FIG. 1:

First node n8 is placed in the root (putting it in front of the queue), when node n4 is placed under node n8, as the only possible one (putting it in the queue after node n8), then nodes n9, n6 and n3 are placed under node n4 (putting them next in the queue), and finally, placing node n7 under node n6, and node n5 under node n3 (putting them next in the queue). Thus, the shortest path from node n1 to node n8 is: n1 to n5 to n3 to n4 to n8.

The invention also makes it possible to obtain the network with the minimum of information enabling the shortest path from an arbitrary node n1 to another arbitrary node n2 in a bi-directional network.

Each node should keep the following information:

A "Neighbour List" of all neighbours of a node. The "Neighbour List" of all nodes together describe the network topology. This list is input to the algorithm. One instance is required for each node.

A "Next To Goal" array data field 4 indexed for registration of all nodes in the network. The size of the array should be N. Each cell 5 in the array should have place for identity of one node 1 (for example a number). Example: array[1 ... N] of integer. This data field will be filled by the algorithm and will contain the only information needed for routing. One instance of this field is required for each node.

A server unit maintains a "Queue" 3 which is a temporary queue that will be deleted when the algorithm has been completed.

Figure 4:
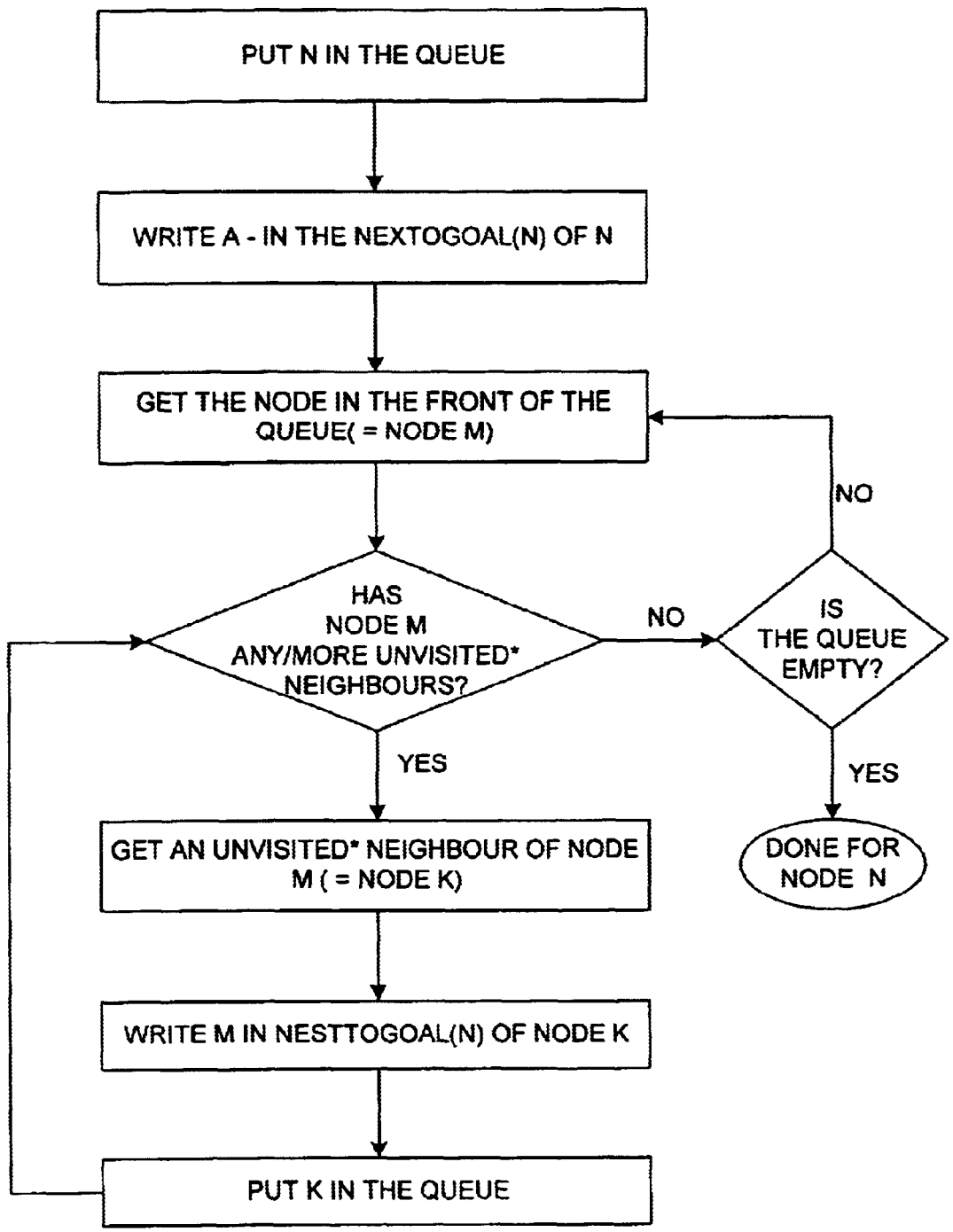
FIG. 4 is a flow chart illustrating the algorithm for calculating the shortest path from all nodes in the network to a particular node n.

The algorithm for calculating the shortest path between all pairs of nodes in the network is illustrated in FIG. 4 and includes the following steps for each node n(n=1. . . N);

Step 1: Put n in the queue. Write a stop command, i.e. "-" in "Next To Goal[n]" of the node.

Step 2: Take the node in front of the queue and write its identity in the "Next To Goal[n]" list of all its neighbours (nodes in its Neighbour List) if the cell is not already written. If the cell is already written, do not write over it.

Step 3: Each time you visit a node and write (only if you write) in "Next To Goal[n]" of this node, put the identity of the visited node in the queue.

Step 4: After visiting all nodes in the "Neighbour List" of the node, remove it from the queue.

Step 5: If the queue is empty, node n is completed, otherwise go to step 2.

END

In FIG. 4, the expression "unvisited" has been used to describe a node which NextToGoal[n] is unwritten, where n is the first node being put in the queue.

The result of the inner loop is the shortest path from all nodes to node n. The result of the outer loop is the shortest path from all nodes to all other nodes. When the algorithm is completed and the network is updated, for taking the shortest path from node n1 to node n2:

Read "Next To Goal" cell [n2] of node n1, call it p.

Go to p, then visit its "Next To Goal" cell [n2] and continue in the same manner until node n2 is reached. "Next To Goal" cell [n2] in node n2 is "-".

When in the inner loop, the shortest path to a node 1 is being calculated, there is possibility to check if the node has a connection to all other nodes (the existence of which it is aware) For this purpose, every time a node is removed from the queue, it should be entered into a set. When the algorithm is done for node n, subtract this set of all nodes which node n knows about. The result is the set of disconnected nodes.

FIG. 3 shows the result of the algorithm after updating the "Next To Goal" list of all nodes.

The information is distributed and each node needs to keep only a minimum of information (in the "Next To Goal" field or list). The cost of the above described algorithms is optimal, that is as much as Dijkstra's algorithm for shortest path between two nodes in a graph. The algorithms will always terminate.

In the above described algorithms, it is assumed that the distance between all neighbouring nodes are the same.

Load on a link can be interpreted as length between two neighbouring nodes (located on the two sides of the link). Low load is interpreted as short distance between the nodes, and vice versa.

It is possible to consider different distances between node pairs in the algorithm by assuming a number of virtual nodes between each pair of real nodes, dependant on the distance between them. For example, if the distance between a node 1 and a node 5 is three meters, one can assume two virtual nodes (called node 151 and node 152) between them. Once putting all these virtual nodes (representing the distance between the neighbouring nodes) in the graph, the algorithm can be performed as the usual case. The only difference is that the "Next To Goal" fields of each node must be updated with identity of the nearest real node from the noted virtual node. When the data structures are completed, they will not know anything about the virtual nodes which were created only for the purpose of computation.

Even if a network normally is bi-directional, it is possible to use the algorithms even for uni-directional graphs after some modifications. The difference is that a node in a uni-directional graph may not know about what nodes are directed to it. It may know just about the nodes it is directed to (the "Neighbour List" describer above).

In order to overcome this problem, an array called "Directed To Me List" is attached to each node. This array contains the identity of all nodes which are directed to it. This array may be removed after the algorithm is completed, if there is no other reason to keep it. The information in the array can be computed from the "Neighbour Lists" attached to the network nodes according to the following algorithm:

BEGIN

Step 1: Put an arbitrary node in a queue.

Step 2: Get the node from the front of the queue (node n) and put its identity (n) in the "Directed TO Me List" of all nodes to which it is directed (nodes in its "Neighbour List"). Each time the "Directed TO Me List" of a node is updated, check if the node is unmarked. If not, mark the node and put it at the end of the queue. (Do not put it in the queue if it was marked).

Step 3: remove n from the queue and then go to step 2 if the queue is not empty.

END

After the algorithm is completed, each node in the graph will have information about the nodes which are directed to it ("Directed TO Me List"). Once the "Directed TO Me List" of the nodes in the graph are computed, the shortest path between all nodes in the uni-directional graph may be computed with the same algorithm as that for the bi-directional case, but with the only difference that instead of "Neighbour List" in the bi-directional case, the "Directed TO Me List" must be used.

It should be clear that the invention is of course not limited to the particulary illustrated embodiments, but that it can be varied in a number of ways within the scope of the appended claims.

What is claimed is:

1. A method of routing messages within a communications network comprising a plurality of nodes having unique identities, the method comprising the steps of:

calculating the shortest path between a first node and a second node by:

forming a list of the identities of all nodes neighboring said first node and to which it is directed, putting the identity of the second node in a queue, writing a stop command in a data field for registration of identity of the second node, taking the identity of the node in front of the queue and writing its identity in the data field of all its neighbors, unless there already is an entry in this data field, putting the identity of a node in the queue each time an entry is written into the data field of this node, removing from the queue the identity of the node in front of the queue, after visiting all nodes in the lost of all neighboring nodes of said node, and repeating the step of taking the identity of the node in front of the queue and writing its identity in the data field of all its neighbors, until the visited node is the first node.

2. A method according to claim 1, further comprising checking the network for nodes which have been disconnected from a certain node.

3. A method according to claim 2, wherein said checking comprises the following steps:

putting the identity of said node in the queue and marking said node, taking the node in front of the queue and marking its unmarked neighbors, each time the identity of a new node is marked, placing it in the queue, after visiting all nodes in the list of the identities of all nodes neighboring said node in front of the queue, moving said node from the queue and putting it in a set of visited nodes, repeating the step of taking the node in front of the queue and marking its unmarked neighbors until the queue is empty, and subtracting the resulting set of visited nodes from the set of all nodes which said node is aware of, wherein the result is the set of nodes which are disconnected from the aforementioned node.

4. A method according to claim 1, further comprising the step of:

representing the distance and/or the traffic load between each pair of nodes by a number of assumed virtual nodes, said number being proportional to said distance and/or traffic load.

5. A method of routing messages within a communications network for sending messages between a plurality of nodes having unique identities, the method comprising the steps of:

calculating the shortest path between all pairs of nodes in the network by:

forming a list of the identities of all nodes neighboring a node and to which it is directed, putting the identity of the node in a queue, writing a stop command for this node in a cell which is indexed in an array data field indexed for registration of identity of all nodes in the network, taking the identity of the node in front of the queue and writing its identity in the cell which is indexed in the data field of all its neighbors, unless there already is an entry in this data field, putting the identity of the visited node in the queue each time an entry is written into the cell which is indexed in the data field of a node, removing from the queue the identity of the node in from of the queue, after visiting all nodes in the list of all neighboring nodes of said nodes, repeating the step of taking the identity of the node in front of the queue and writing its identity in the data field cell of all its neighbors, until the queue is empty, and repeating the above step for all nodes in the network.

6. A method according to claim 5, further comprising checking the network if a node has connection to all other nodes.

7. A method according to claim 6, wherein said checking comprises the following steps:

putting the identity of said node in the queue and marking said node, taking the node in front of the queue and marking its unmarked neighbors, each time the identity of a new node is marked, placing it in the queue, after visiting all nodes in the list of the identities of all nodes neighboring said node in front of the queue, moving said node from the queue and putting it in a set of visited nodes, repeating the step of taking the node in front of the queue and marking its unmarked neighbors until the queue is empty, and subtracting the resulting set of visited nodes from the set of all nodes which said node is aware of, wherein the result is the set of nodes which are disconnected nodes.

8. A method according to claim 5, further comprising the step of:

representing the distance and/or traffic between each pair of nodes by a number of assumed virtual nodes, said number being proportional to said distance and/or traffic load.

* * * * *